(12) United States Patent
Qiu et al.

(10) Patent No.: US 12,422,333 B2
(45) Date of Patent: Sep. 23, 2025

(54) DUAL-DIAL MEASUREMENT DEVICE AND MEASUREMENT METHOD FOR VIEWING ANGLE MEASUREMENT OF OPTICAL COMPONENT

(71) Applicant: Southwest Petroleum University, Chengdu (CN)

(72) Inventors: Yi Qiu, Chengdu (CN); Wei Wang, Chengdu (CN); Fuzhi Chen, Chengdu (CN); Lihua Li, Chengdu (CN); Keqing Liu, Chengdu (CN); Yun Qi, Chengdu (CN); Huashan Lan, Chengdu (CN); Lisha Wu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 351 days.

(21) Appl. No.: 18/318,341

(22) Filed: May 16, 2023

(65) Prior Publication Data
US 2023/0375438 A1  Nov. 23, 2023

(30) Foreign Application Priority Data

May 17, 2022  (CN) .......................... 202210533300.0

(51) Int. Cl.
*G01B 5/24* (2006.01)
*G01M 11/02* (2006.01)

(52) U.S. Cl.
CPC .......... *G01M 11/0207* (2013.01); *G01B 5/24* (2013.01)

(58) Field of Classification Search
CPC ....... G01M 11/0207; G01B 5/24; G01B 11/26
See application file for complete search history.

(56) References Cited

U.S. PATENT DOCUMENTS

2023/0375438 A1* 11/2023 Qiu ........................ G01B 11/26
2024/0148279 A1*  5/2024 Vakeri .................. A61B 5/4571

FOREIGN PATENT DOCUMENTS

| CN | 103486936 A | * | 1/2014 | |
| CN | 217845047 U | * | 11/2022 | |
| DE | 4432317 A1 | * | 3/1996 | .............. G01B 5/24 |
| JP | 2024127353 A | * | 9/2024 | |

\* cited by examiner

*Primary Examiner* — Yaritza Guadalupe-McCall
(74) *Attorney, Agent, or Firm* — Hemisphere Law, PLLC; Zhigang Ma

(57) ABSTRACT

A double-dial measurement device and a measurement method for viewing angle measurement of an optical component are provided. The device includes a support frame, a large dial, a small dial, a vernier disc, verniers and an objective table. When the first locking knot is fastened and the small dial rotates, the large dial or the vernier disc are driven to rotate synchronously, which refers to a rotation motion centered on an axis of the large dial under external force. When a symmetrical light source is irradiated on the optical component, an exit angle of exit lights is used to measure the viewing angle, effectively measuring the effective viewing angle of a single optical component and an optical component set, evaluating the optical component or system with reference to the viewing angle, and providing guidance and reference for the optical component.

10 Claims, 8 Drawing Sheets

DUAL-DIAL MEASUREMENT DEVICE AND MEASUREMENT METHOD FOR VIEWING ANGLE MEASUREMENT OF OPTICAL COMPONENT

TECHNICAL FIELD

The disclosure relates to the technical field of measurement of optical components, and more particularly to a double-dial measurement device and a measurement method for viewing angle measurement of an optical component.

BACKGROUND

Viewing angle is an important parameter for optical components, and therefore, it is of great significance to research and measurement on the viewing angle. For example, human eyes see a composite image, i.e., two images stitched together to form a field of view about 180°. Application areas and values of optical systems such as gems, single lenses, and lens sets (i.e., cameras and space telescope systems) also depend on a size of their viewing fields.

For the measurement on the viewing angle, there are methods such as echo measurement, full combination angle measurement, and multi angle displacement measurement in the related art. These measurement methods have their own characteristics, but the disadvantages are also obvious, for example, measurement accuracy is low or a measurement device costs much. Therefore, to some extent, the above-mentioned disadvantages limit their use in actual measurement of the viewing angle.

SUMMARY

When a beam of incident light is irradiated onto an optical component, there are lights emitted from the optical component. The disclosure provides a double-dial measurement device for viewing angle measurement of an optical component, and the device performs the viewing angle measurement by using a double-dial measurement method. When a beam of parallel light is incident on the optical component and passes through it, the viewing angle of the optical component can be calculated by firstly measuring an angle of the outgoing lights and a rotation angle of the device, and then obtaining a result based on a geometric relationship between the angle of the outgoing lights and the rotation angle of the device.

The disclosure is implemented by the following technical solution: providing a dual-dial measurement device for viewing angle measurement of an optical component, which includes:

a support frame;
a large dial, connected to the support frame;
a small dial, connected to the support frame and capable of rotating relative to the support frame, which is eccentric with the large dial and an axis of which is parallel to an axis of the large dial;
a vernier disc, connected to the support frame and coaxial with the large dial;
at least one vernier, disposed on the vernier disc and attached to the large dial;
an objective table, connected to the support frame and disposed directly above a center of the vernier disc.

In an embodiment, the large dial and the vernier disc are capable of rotating relative to each other; a first locking knob is disposed between the small dial and the large dial or the vernier disc, and when the first locking knob is fastened and the small dial rotates, the large dial or the vernier disc is configured to rotate synchronously.

In an embodiment, a levelness of the objective table is configured to be adjusted and not to be adjusted, a height of the objective table is configured to be adjusted and not to be adjusted, the objective table is configured to be rotated and not rotated relative to the support frame, and a height of the small dial is configured to be adjusted and not to be adjusted.

In an embodiment, the rotating refers to a rotation motion centered on the axis of the large dial under an external force.

In an embodiment, a number of the at least one vernier is two, and the two verniers are spaced 180° apart in a circumference.

In an embodiment, a top portion of the small dial is provided with a positioning straight rod. A principle of the positioning straight rod is that when a symmetrical light source is irradiated on the optical component, an exit angle of exit lights of the optical component is measured, and therefore, a various angle of the lights can be conveniently measured through a projection of the lights to the positioning straight rod.

In an embodiment, a manner that the large dial and the vernier disc are capable of rotating relative to each other is realized by one of the following three modes:

mode 1, the large dial is capable of rotating relative to the support frame, the vernier disc is not capable of rotating relative to the support frame, and a second locking knot is provided between the large dial and the support frame;

mode 2, the large dial is capable of rotating relative to the support frame, the vernier disc is capable of rotating relative to the support frame, a second locking knot is provided between the large dial and the support frame, and a third locking knot is provided between the vernier disc and the support frame; and mode 3, the large dial is not capable of rotating relative to the support frame, the vernier disc is capable of rotating relative to the support frame and a third locking knot is provided between the vernier disc and the support frame.

In an embodiment, a shape of the large dial is a ring, a shape of the vernier disc is a disc, the vernier disc is disposed in an inner circumference of the large dial, the at least one vernier is fixedly disposed on an edge of the vernier disc, and a top surface of the vernier disc is black or not black; or a shape of the vernier disc is a ring, a shape of the large dial is a disc, the large dial is disposed in an inner circumference of the vernier disc, and a top surface of the large dial is black or not black.

In an embodiment, the support frame includes a base and a shaft, and the large dial is coaxial with the shaft; the shaft is rotatably provided with a first shaft sleeve, the large dial is fixedly connected to the first shaft sleeve, and a second locking knot is disposed between the first shaft sleeve and the shaft; the first shaft sleeve is rotatably provided with a second shaft sleeve, the small dial is fixedly connected to the second shaft sleeve through a connection rod, and the first locking knot is disposed between the second shaft sleeve and the first shaft sleeve; or the shaft is rotatably provided with a first shaft sleeve, the vernier disc is fixedly connected to the first shaft sleeve, and a third locking knot is disposed between the first shaft sleeve and the shaft; the first shaft sleeve is rotatably provided with a second shaft sleeve, the small dial is fixedly connected to the second shaft sleeve through a connection rod, and the first locking knot is disposed between the second shaft sleeve and the first shaft sleeve; or the shaft is rotatably provided with a first shaft sleeve and a third shaft sleeve, the large dial is fixedly connected to the first shaft sleeve, and a second locking knot is disposed between the first shaft sleeve and the shaft; the vernier disc is fixedly connected to the third shaft sleeve, and a third locking knot is disposed between the third shaft sleeve and the shaft; one of the first shaft sleeve and the third shaft sleeve is rotatably provided with a second shaft sleeve, the small dial is fixedly connected to the second shaft sleeve through a connection rod, and the first locking knot is disposed between the second shaft sleeve and the one of the first shaft sleeve and the third shaft sleeve; or the shaft is rotatably provided with a first shaft sleeve, the large dial is fixedly connected to the first shaft sleeve, the large dial is provided with a sliding block, the sliding block is capable of rotating, the small dial is fixedly connected to the sliding block, and the first locking knot is disposed between the sliding block and the large dial; or the shaft is rotatably provided with a first shaft sleeve, the vernier dis is fixedly connected to the first shaft sleeve, the vernier disc is provided with a sliding block, the sliding block is capable of rotating, the small dial is fixedly connected to the sliding block, and the first locking knot is disposed between the sliding block and the vernier disc.

In an embodiment, the objective table is disposed on a top portion of the shaft.

In an embodiment, the objective table includes an adjustable table and a fixed table, the fixed table is fixedly connected to the support frame, the adjustable table is disposed on the fixed table, a circumference of the fixed table is provided with at least three vertical screws at intervals, and when the at least three vertical screws are screwed, the at least three vertical screws are configured to be abutted against the adjustable table from bottom to top.

In an embodiment, the dual-dial measurement device for viewing angle measurement of an optical component further includes: a light source mounting component, the light source mounting component is fixedly connected to or not fixedly connected to the support frame, the light source mounting component is provided with a light source placing position, and the light source placing position is dispose at a periphery of the large dial.

The disclosure further provided a measurement method for viewing angle measurement of the optical component, including the following steps:

step 1, placing a light source on an outside of the large dial, placing an optical component to be tested directly above the large dial, which makes the light source and the optical component to be tested being disposed on a horizontal line L1;

step 2, moving the small dial along a circumferential direction centered on the axis of the large dial, making a vertical connection line L2 between the axis of the small dial and the axis of the large dial perpendicular to the horizontal line L1;

reading a scale of the large dial at this time through the vernier recorded as $\alpha_1$ when a number of the at least one vernier is one; or respectively reading scales of the large dial at this time through the two verniers recorded as $\alpha_1$ and $\alpha'_1$ when a number of the at least one vernier is two; and recording a scale of the small dial recorded as $\beta_1$ that the vertical connection line L2 rightly directs;

step 3, continuously moving the small dial along the circumferential direction centered on the axis of the large dial, at which the one of the large dial and the vernier disc is simultaneously moving along with the small dial; when a clear rainbow and neon phenomenon occurs on the small dial, continuously moving the small dial to enable the clear rainbow or the neon phenomenon pass through a circle center of the small dial, at which the small dial stops moving; or when a top portion of the small dial is provided with a positioning straight rod, a projection of the positioning straight rod occurs on the small dial, at which the small dial stops moving; and reading a scale of the large dial at this time through the vernier recorded as $\alpha_2$ when the number of the at least one vernier is one; or respectively reading scales of the large dial at this time through the two verniers recorded as $\alpha_2$ and $\alpha'_2$ when the number of the at least one vernier is two; and recording a scale of the small dial recorded as $\beta_2$, where the rainbow or the neon phenomenon overlaps with the small dial; and step 4, calculating an viewing angle of the optical component to be tested through the following formula:

$\theta = 90° - \alpha - \beta$, when the number of the at least one vernier is one, $\alpha = |\alpha_2 - \alpha_1|$ and $|\beta| = |\beta_1 - \beta_2|$; or when the number of the at least one vernier is two, $$\alpha = \frac{1}{2}|(\alpha_1 - \alpha_2) + (\alpha'_1 - \alpha'_2)|$$

and $\beta = |\beta_1 - \beta_2|$.

Compared with the related art, the disclosure has the following beneficial effects. According to the disclosure, the movement angle of the small dial in the circumferential direction is read through the scales of the verniers and the large dial; the varied angle of the direction of the lights is measured through the variation of the lights on the small dial, thereby calculating the size of the view angle of the optical component. The device of the disclosure is simple in structure, costs little, and can be used for the viewing angle measurement of a single optical component and an optical component set. Therefore, it is possible to evaluate the optical component or the optical system according to the important parameter (i.e., the viewing angle), and the viewing angle also provides guidance and reference for the application of the optical component.

DESCRIPTION OF REFERENCE NUMERALS

Figure 1:
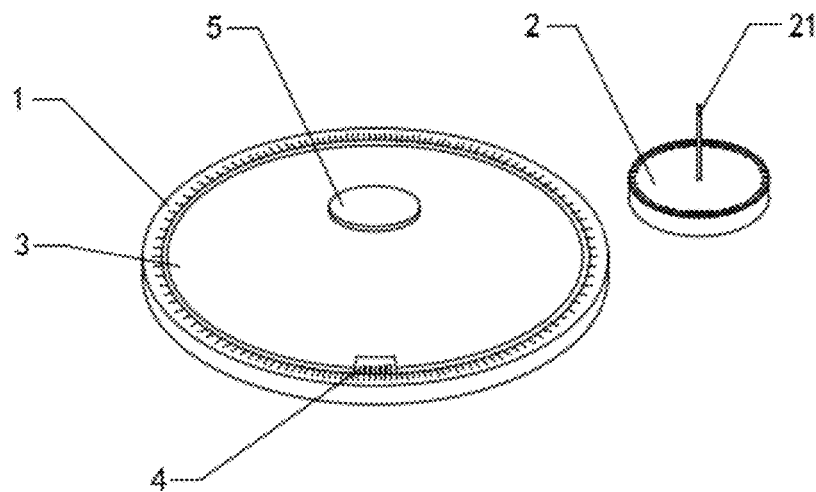
FIG. 1 illustrates a three-dimensional diagram of a large dial, a small dial, and a vernier disc according to an embodiment of the disclosure.

1—large dial; 2—small dial; 3—vernier disc; 4—vernier; 5—objective table; 6—light source mounting component; 7—support frame; 8—optical component to be tested; 9—light source;
21—positioning straight rod; 22—connection rod;
51—adjustable table; 52—fixed table;
61—first-degree rod; 62—second-degree cylinder; 63—loking rotary knot; and
70—shaft; 701—first shaft sleeve; 702—second shaft sleeve; 703—third shaft sleeve; 704—vertical screw; 71—first locking knot; 72—second locking knot; 73—third locking knot; 74—sliding block; 75—base.

DETAILED DESCRIPTION OF EMBODIMENTS

In order to make objectives, technical solutions and advantages of the disclosure clearly, the technical solutions in embodiments of the disclosure will be clearly and completely described below with reference to attached drawings of the embodiments. Apparently, the described embodiments are some of the embodiments of the disclosure rather than all of the embodiments of the disclosure. The elements of the embodiments of the disclosure, which are generally described and illustrated herein, may be arranged and designed in a variety of different configurations.

Therefore, the following detailed description of the embodiments of the disclosure provided in the attached drawings is not intended to limit the scope of the disclosure, but merely represents an illustrated embodiment of the disclosure. Other embodiments obtained by those skilled in the related art based on the embodiments of the disclosure without creative efforts all fall within the protection scope of the disclosure.

It should be noted that, in the case of no conflict, the features in the embodiments and the embodiments of the disclosure may be combined with each other in a random manner. It should be noted that the various embodiments in the description of the disclosure are described in a progressive manner. Each illustrated embodiment focuses on the difference from the other embodiments, and the same similar parts between the various embodiments refer to each other.

It should be noted that similar labels and letters represent similar terms in the attached drawings below, and therefore, once a certain item is defined in one of the attached drawings, it is not necessary to further define and interpret it in the other subsequent drawings.

In the description of the disclosure, it should be noted that the orientation or positional relationship indicated by the terms "upper", "lower", "inner", "outer" and the like is based on an orientation or positional relationship shown in the attached drawings, or is an orientation or positional relationship that is often placed when the disclosure is used, or is an orientation or positional relationship commonly understood by those skilled in the related art. In addition, the terms "first", "second" and the like are only used for distinguishing descriptions, and cannot be understood as indicating or implying relative importance.

In the description of the disclosure, it should be further noted that the terms "setting", "mounting", "connected" and "connecting to" should be understood broadly unless expressly specified and defined otherwise. For example, the connection may be a fixed connection, a detachable connection, or an integrated connection; may be a mechanical connection or an electrical connection; may be a direct connection or an indirect connection through an intermediate medium; and may be an internal communication between two elements. For those skilled in the related art, the specific meaning of the above terms in the disclosure may be understood according to an actual situation.

Embodiment 1

As shown in FIG. 1, the embodiment 1 provides a double-dial measurement device for viewing angle measurement of an optical component, including a large dial 1, a small dial 2, a vernier disc 3, a vernier 4, an objective table 5, and a support frame 7.

In the embodiment 1, the large dial 1 is connected to the support frame 7, the small dial 2 is connected to the support frame 7 and is capable of rotating relative to the support frame 7, and the small dial 2 is eccentric with the large dial 1 but an axis of the small dial 2 is parallel to an axis of the large dial 1.

In the embodiment 1, the vernier disc 3 is connected to the support frame 7 and is coaxial with the large dial 1, and the vernier 4 is disposed on the vernier disc 3 and attached to the large dial 1.

In the embodiment 1, the objective table 5 is connected to the support frame 7 and is disposed directly above a center of the vernier disc 3.

The large dial 1 and the vernier disc 3 are capable of rotating relative to each other. In the embodiment 1, the large dial 1 can rotate relative to the support frame 7, and the vernier disc 3 cannot rotate relative to the support frame 7; a second locking knot 72 is disposed between the large dial 1 and the support frame 7, and therefore, when the second locking knot 72 is fastened, the large dial 1 cannot rotate.

In the embodiment 1, a first locking knot 71 is disposed between the small dial 2 and the large dial 1. When the first locking knot 71 is fastened and the small dial 2 rotates, the large dial 1 is driven to rotate synchronously; and when the first locking knot 71 is unlocked, the small dial 2 rotates independently.

The rotating herein refers to a rotation motion cantered on the axis of the large dial 1 under an external force.

Figure 2:
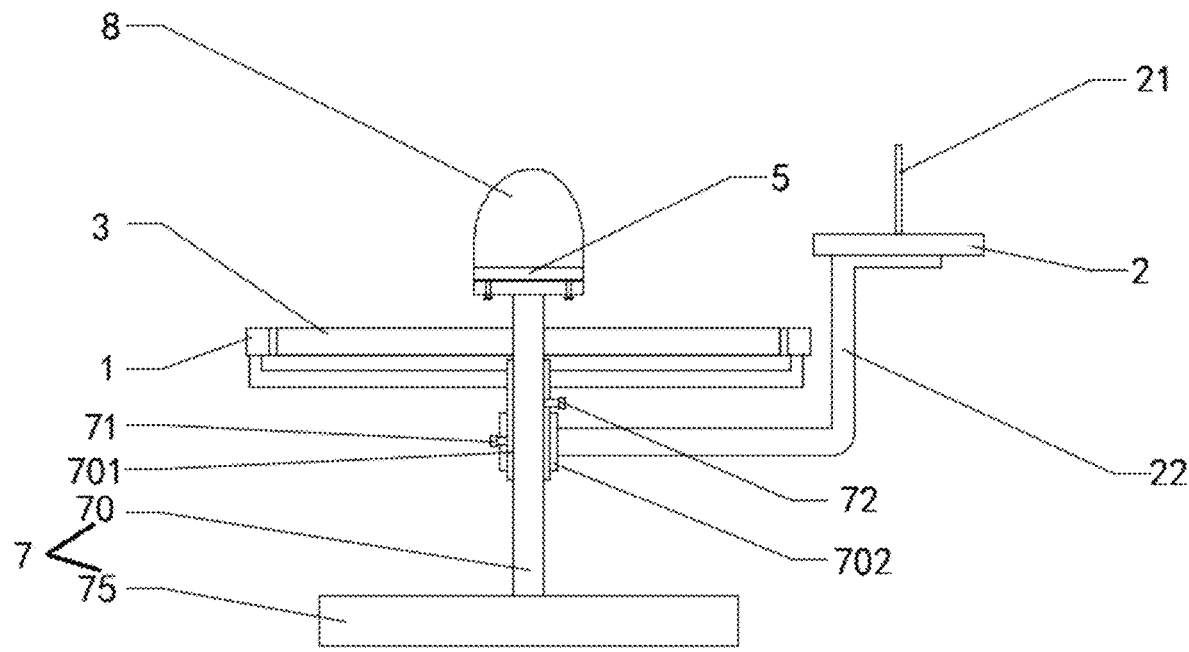
FIG. 2 illustrates a schematic structural diagram of a dual-dial measurement device for viewing angle measurement of an optical component according to an embodiment 1 of the disclosure.

In an illustrated embodiment, as shown in FIG. 2, the support frame 7 includes a base 75 and a shaft 70 and the large dial 1 is coaxial with the shaft 70; a first shaft sleeve 701 is rotatably mounted on the shaft 70, the large dial 1 is fixedly connected to the first shaft sleeve 701, and the second locking knot 72 is disposed between the first shaft sleeve 701 and the shaft 70; a second shaft sleeve 702 is rotatably mounted on the first shaft sleeve 701, the small dial 2 is fixedly connected to the second shaft sleeve 702 through a connection rod 22, and the first locking knot 71 is disposed between the second shaft sleeve 702 and the first shaft sleeve 701.

In the embodiment 1, a shape of the large dial 1 is a ring, a shape of the vernier disc 3 is a disc, the vernier disc 3 is disposed in an inner circumference of the large dial 1, the vernier 4 is fixedly installed at an edge of the vernier disc 3, and a top surface of the vernier disc 3 is black or not black. When the top surface of the vernier disc 3 is black, it is more convenient to observe the pathway of the lights through the optical component.

In an illustrated embodiment, a top portion of the small dial 2 is provided with a positioning straight rod 21 and the positioning straight rod 21 is coaxial to the axis of the small dial 2.

In an illustrated embodiment, it is designed to provide two verniers 4 to eliminate eccentric errors and to promote measurement accuracy; and the two verniers 4 are arranged at 1800 apart in a circumference; and then scale data of each of the two verniers 4 is read to calculate a difference respectively, and then a summation and an average calculation are performed on the differences of the two verniers 4 to obtain a rotated angle, thereby reducing the measurement error.

Division values of the large dial 1, the small dial 2 and each the vernier 4 can be reasonably set according to requirements. In an illustrated embodiment, a minimum division value of the large dial 1 is 30 seconds, each the vernier 4 has 30 scale divisions, and a minimum division value of the vernier 4 is equal to that 30 seconds are divided into 30 parts, i.e., a scale division of the verniers equal to 1 second. The small dial 2, depending on its manufacturing process and precision requirements, may be at an accuracy of 0.5 degrees or less, depending on how many stripes can be marked on the small dial 2.

Figure 3:
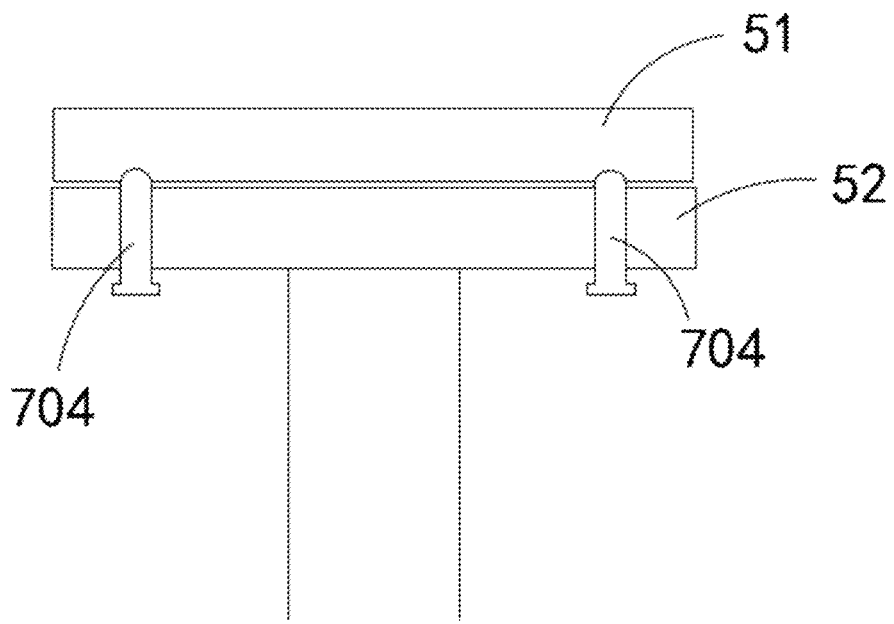
FIG. 3 illustrates a schematic structural diagram of an objective table with adjustable levelness according to an embodiment of the disclosure.

In an illustrated embodiment, a levelness of the objective table 5 can be adjusted, as shown in FIG. 3, the objective table 5 includes an adjustable table 51 and a fixed table 52, the fixed table 52 is fixedly connected to the support frame 7, the adjustable table 51 is disposed on the fixed table 52, a circumference of the fixed table 52 is provided with at least three vertical screws 704, and when the vertical screws 704 are screwed, it is possible to be abutted against the adjustable table 51 from bottom to top. Specially, when the vertical screws 704 are in contact to the adjustable table 51, a bottom surface of the adjustable table 51 corresponding to positions of the vertical screws 704 is provided with matched grooves, which prevents from slipping. Furthermore, the levelness of the objective table 5 is adjusted by adjusting an extension length of the vertical screw 704. In the illustrated embodiment, the objective table 5 is mounted on a top portion of the shaft 70 or the vernier disc 3.

In the embodiment 1, a measurement method for viewing angle measurement of the optical component is described by taking a measurement of rainbow and neon phenomenon as an example, which includes the steps as follows.

Figure 4:
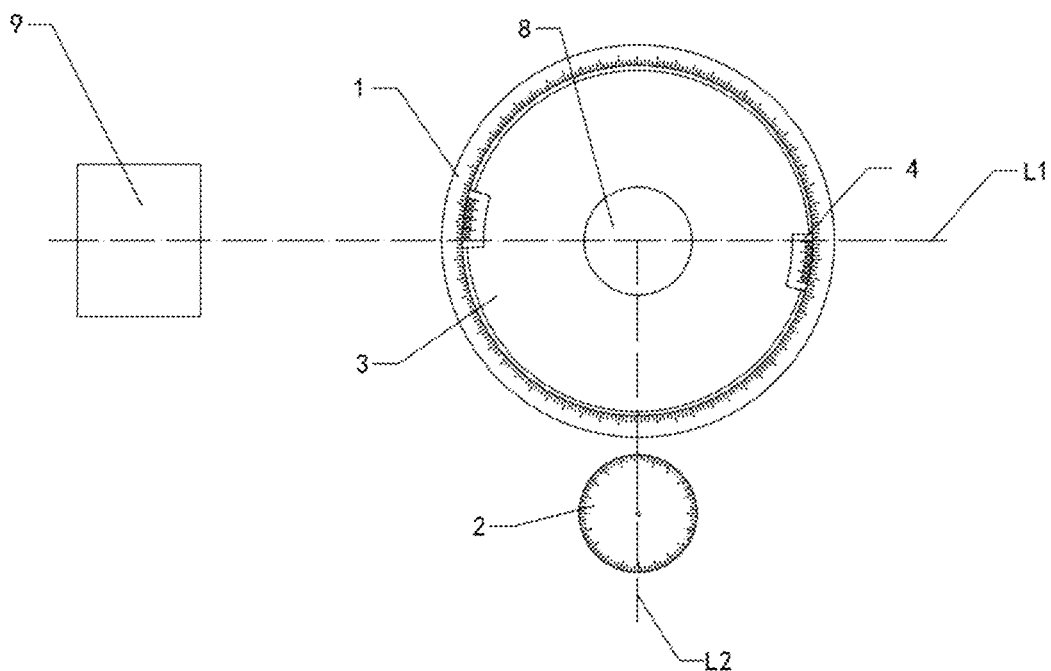
FIG. 4 illustrates a schematic diagram of a light source and an optical component to be tested on the same horizontal line L1, where a vertical connection line L2 between a central axis of the small dial and a central axis of the large dial is perpendicular to the horizontal line L1.

Step 1, as shown in FIG. 4, a light source 9 is placed on an outside of the large dial 1, an optical component to be tested 8 is placed on the objective table 5, and the light source 9 and the optical component to be tested 8 are disposed on the same horizontal line L1.

Step 2, the first locking knot 71 is loosened, the small dial 2 is moved along a circumferential direction centered on the axis of the large dial 1 to make that a vertical connection line L2 between the axis of the small dial 2 and the axis of the large dial 1 is perpendicular to the horizontal line L1, as shown in FIG. 4.

At this time, a scale of the large dial 1 is read through the vernier 4 and is recorded as $\alpha_1$ when there is only one vernier 4; or when there are two verniers 4, scales of the large dial 1 are respectively read through the two verniers 4 and are recorded as $\alpha_1$ and $\alpha'_1$. Meanwhile, a scale of the small dial 2 is recorded as $\beta_1$ that the vertical connection line L2 rightly directs.

Step 3, the second locking knot 72 is loosened, the first locking knot 71 is fastened, the small dial 2 is continuously moved along the circumferential direction centered on the axis of the large dial 1, and the large dial 1 is driven to move synchronously; when a clear rainbow and neon phenomenon occurs, the small dial 2 is continuously moved until that the rainbow or neon phenomenon passes through a circle center of the small dial 2, at which the small dial 2 is stopped from moving. In an illustrated embodiment, a top portion of the small dial 2 is provided with a positioning straight rod 21, and therefore, when a clear projection of the positioning straight rod 21 occurs on the small dial 2, the small dial 2 is stopped from moving.

Figure 5:
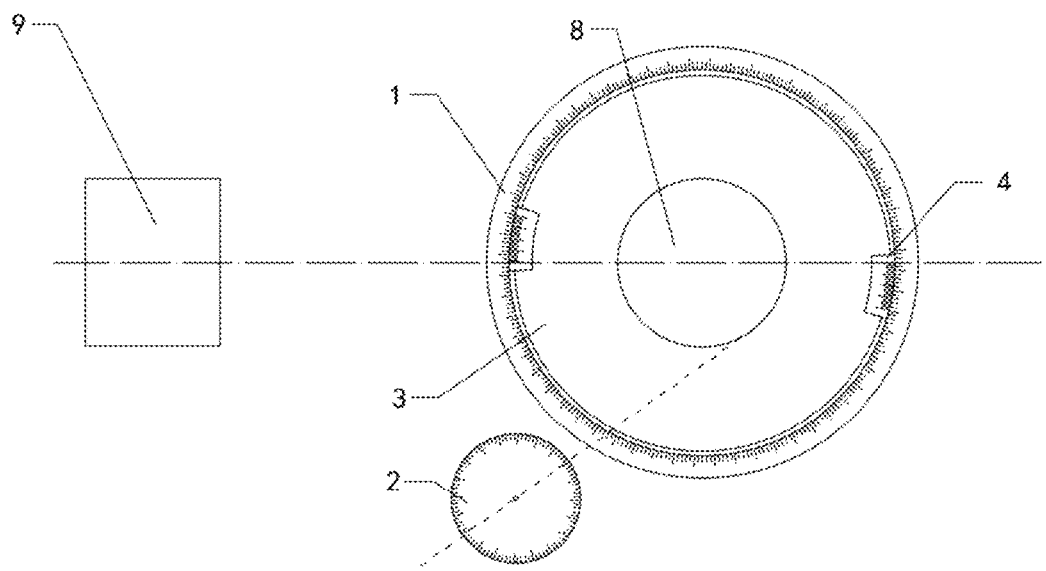
FIG. 5 illustrates a schematic diagram of an embodiment of the disclosure in which the small dial is moved in place.

At this time, a scale of the large dial 1 is read through the vernier 4 and is recorded as $\alpha_2$; or when there are two verniers 4, scales of the large dial 1 are respectively read through the two verniers 4 and are recorded as $\alpha_2$ and $\alpha'_2$. Meanwhile, a scale of the small dial 2 is recorded as $\beta_2$ where the rainbow or the neon phenomenon overlaps with the small dial 2, as shown in FIG. 5.

Figure 6:
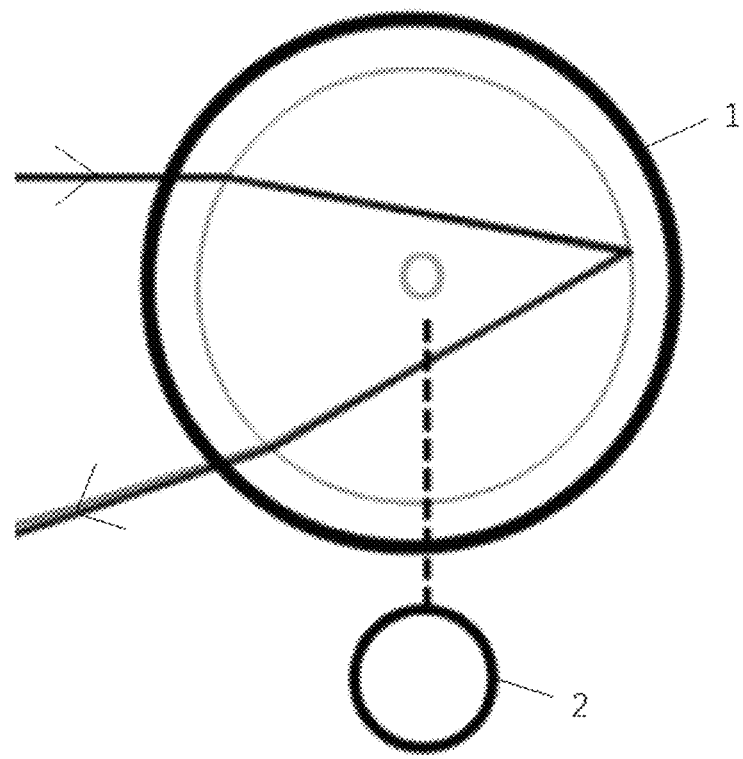
FIG. 6 illustrates a schematic diagram of an optical pathway according to an embodiment of the disclosure.
Figure 7:
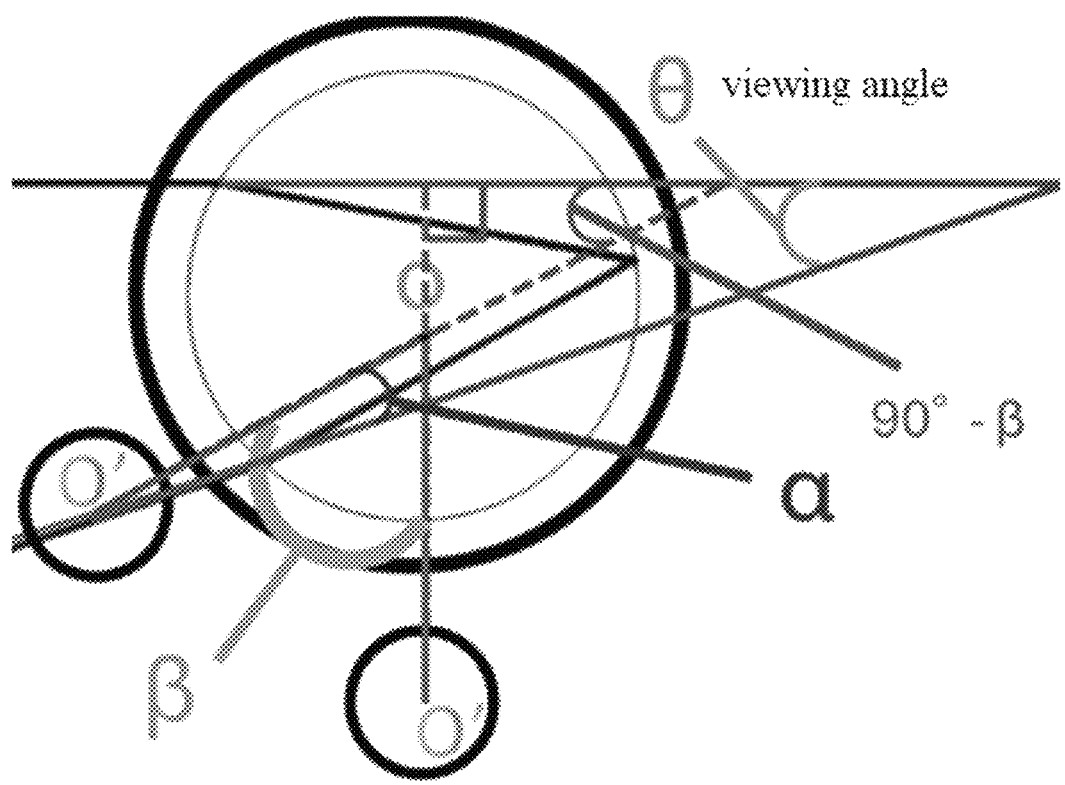
FIG. 7 illustrates a diagram of a geometric relationship between a viewing angle and the optical pathway.

As shown in FIG. 6 and FIG. 7, according to a geometric relationship, the viewing angle of the optical component can be calculated by the following formula:

$$\theta = 90° - \alpha - \beta.$$

When there is only one vernier 4, $\alpha = |\alpha_2 - \alpha_1|$ and $\beta = |\beta_1 - \beta_2|$; or when there are two verniers, $$\alpha = \frac{1}{2}|(\alpha_1 - \alpha_2) + (\alpha'_1 - \alpha'_2)|$$

$$\text{and } \beta = |\beta_1 - \beta_2|.$$

In an illustrated embodiment, in order to facilitate later calculation, $\alpha_1$ is equal to 0° or 180°, $\beta_1$ is equal to 0°, and 0° of the small dial 2 directly faces 90° of the large dial 1.

Embodiment 2

Figure 8:
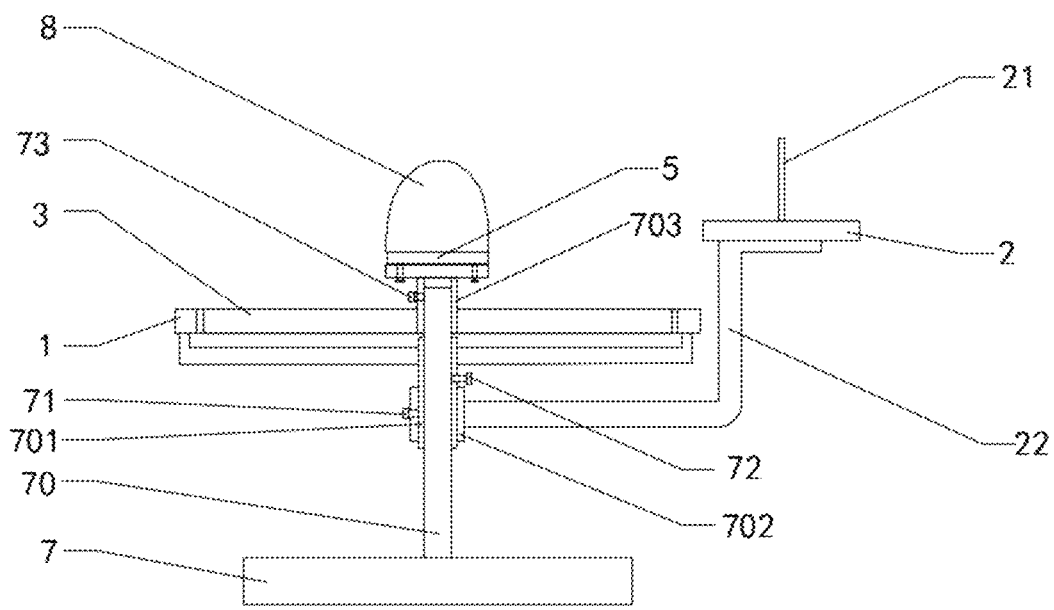
FIG. 8 illustrates a schematic structural diagram of a dual-dial measurement device for viewing angle measurement of an optical component according to an embodiment 2 of the disclosure.

As shown in FIG. 8, in the embodiment 2, the large dial 1 can rotate relative to the support frame 7, the vernier disc 3 can rotate relative to the support frame 7, a second locking knot 72 is disposed between the large dial 1 and the support frame 7, a third locking knot 73 is disposed between the vernier disc 3 and the support frame 7, and when the third locking knot 73 is fastened, the vernier disc 3 cannot rotate.

In an illustrated embodiment, a first shaft sleeve 701 and a third shaft sleeve 703 are rotatably mounted on the shaft 70, the large dial 1 is fixedly connected to the first shaft sleeve 701, and the second locking knot 72 is disposed between the first shaft sleeve 701 and the shaft 70; the vernier disc 3 is fixedly connected to the third shaft sleeve 703, and the third locking knot 73 is disposed between the third shaft sleeve 703 and the shaft 70; a second shaft sleeve 702 is rotatably mounted on the first shaft sleeve 701 or the third shaft sleeve 703, the small dial 2 is fixedly connected to the second shaft sleeve 702 through a connection rod 22, and the first locking knot 71 is disposed between the second shaft sleeve 702 and the first shaft sleeve 701 or the third shaft sleeve 703.

In an illustrated embodiment, the objective table 5 is fixedly connected to the third shaft sleeve 703, and therefore, the objective table 5 and the vernier disc 3 can rotate synchronously.

Embodiment 3

Figure 9:
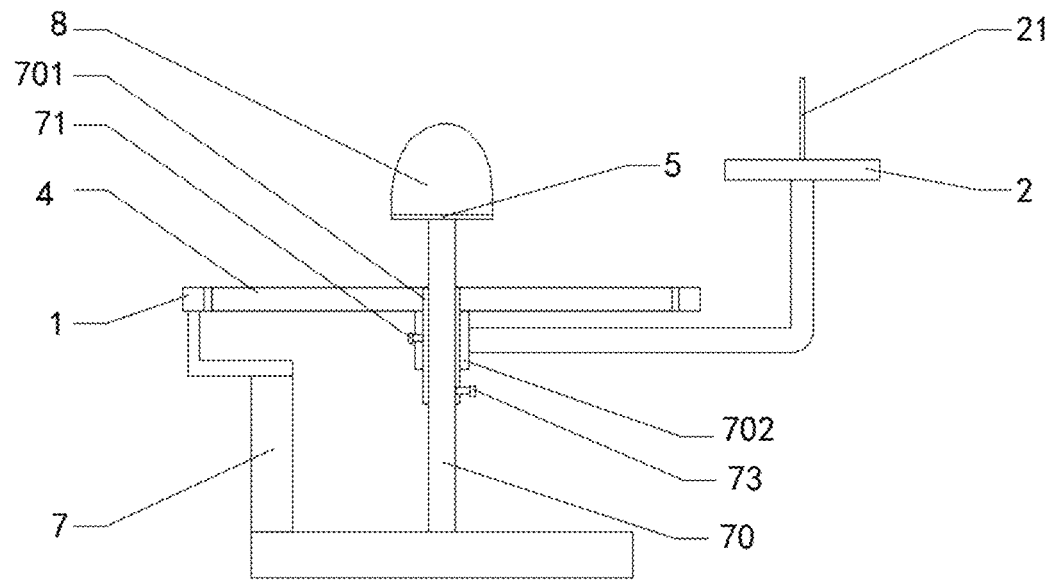
FIG. 9 illustrates a schematic structural diagram of a dual-dial measurement device for viewing angle measurement of an optical component according to an embodiment 3 of the disclosure.

As shown in FIG. 9, in the embodiment 3, the large dial 1 cannot rotate relative to the support frame 7, the vernier disc 3 can rotate relative to the support frame 7, and a third locking knot 73 is disposed between the vernier disc 3 and the support frame 7.

In an illustrated embodiment, a first shaft sleeve 701 is rotatably mounted on the shaft 70, the vernier disc 3 is fixedly connected to the first shaft sleeve 701, and the third locking knot 73 is disposed between the first shaft sleeve 701 and the shaft 70; a second shaft sleeve 702 is rotatably mounted on the first shaft sleeve 701, the small dial 2 is fixedly connected to the second shaft sleeve 702 through a connection rod 22, and the first locking knot 71 is disposed between the second shaft sleeve 702 and the first shaft sleeve 701.

In the embodiment 3, a measurement method for viewing angle measurement of the optical element includes the steps as follows.

Step 1, a light source 9 is placed on an outside of the large dial 1, an optical component to be tested 8 is placed on the objective table 5, and the light source 9 and the optical component to be tested 8 are disposed on the same horizontal line L1.

Step 2, the first locking knot 71 is loosened, the small dial 2 is moved along a circumferential direction centered on the axis of the large dial 1 to make that a vertical connection line L2 between the axis of the small dial 2 and the axis of the large dial 1 is perpendicular to the horizontal line L1, as shown in FIG. 4.

Scales of the large dial 1 are read currently through the two verniers 4, and meanwhile, a scale of the small dial 2 is read that the vertical connection line L2 rightly directs.

Step 3, the second locking knot 72 is loosened, the first locking knot 71 is fastened, the small dial 2 is continuously moved along the circumferential direction centered on the axis of the large dial 1, the verniers disc 3 is driven to move synchronously; when a clear rainbow and neon phenomenon occurs, the small dial 2 is continuously moved until that the rainbow or the neon phenomenon passes through a circle center of the small dial 2, and then the small dial 2 is stopped from moving. In the illustrated embodiment, the top portion of the small dial 2 is provided with the positioning straight rod 21, and therefore, when a clear projection of the positioning straight rod 21 occurs on the small dial 2, the small dial 2 is stopped from moving.

As shown in FIG. 5, current scales of the large dial 1 are read through the two verniers 4, and meanwhile, a scale of the small dial 2 is recorded where the rainbow or the neon phenomenon overlaps with the small disc 2.

Embodiment 4

Figure 10:
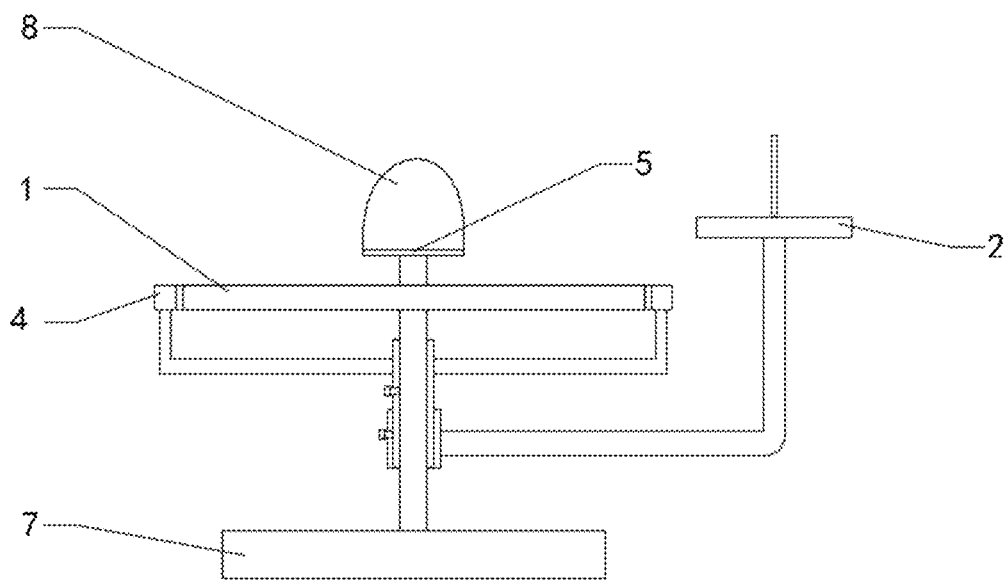
FIG. 10 illustrates a schematic structural diagram of a dual-dial measurement device for viewing angle measurement of an optical component according to an embodiment 4 of the disclosure.
Figure 11:
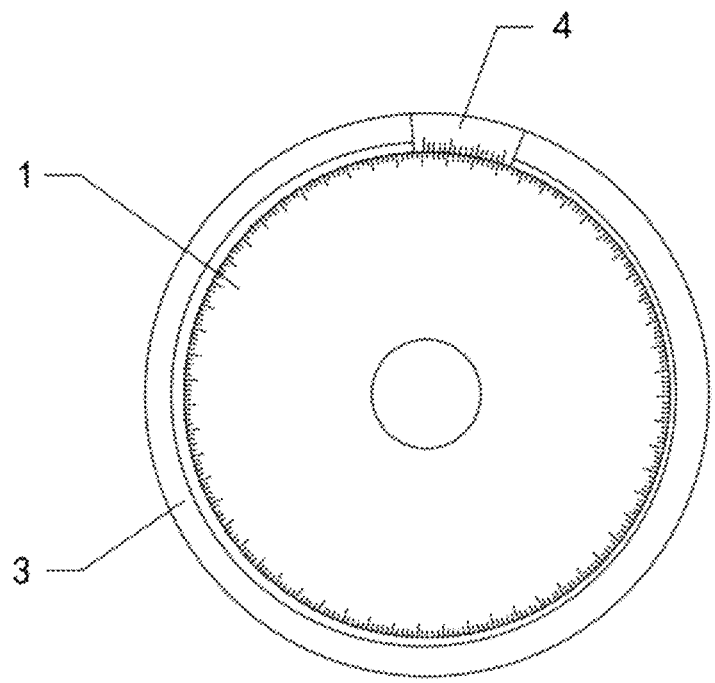
FIG. 11 illustrates a schematic diagram of a large dial, a vernier disc and a vernier according to the embodiment 4 of the disclosure.

As shown in FIG. 10 and FIG. 11, a difference between the embodiment 4 and the foregoing embodiments 1-3 is that a shape of the vernier disc 3 is a ring, a shape of the large dial 1 is a disc, and the large dial 1 is disposed in an inner circumference of the vernier disc 3. In the embodiment 4, a top surface of the large dial 1 is black or not black.

Embodiment 5

Figure 12:
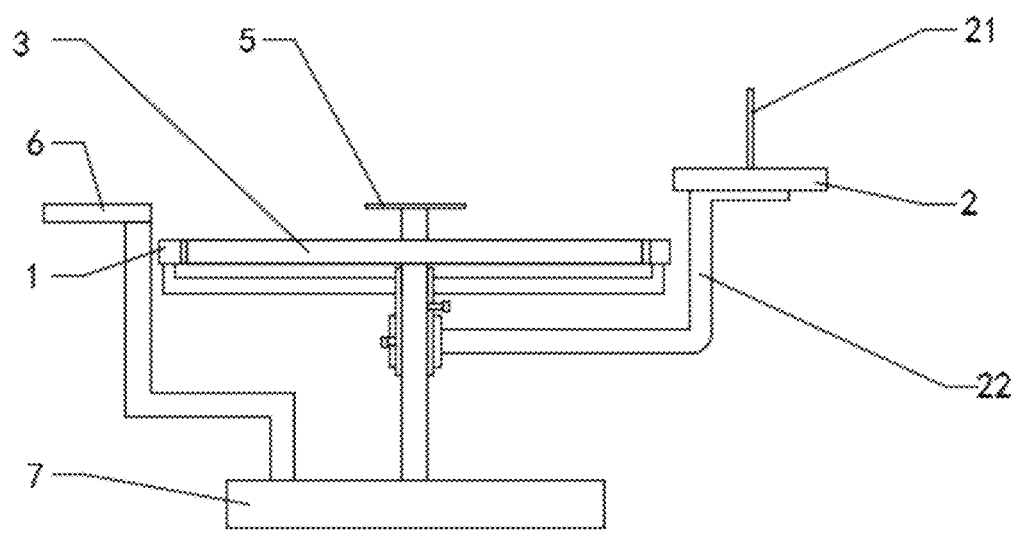
FIG. 12 illustrates a schematic structural diagram of a dual-dial measurement device for viewing angle measurement of an optical component according to an embodiment 5 of the disclosure.

In order to facilitate an installation of a light source, as shown in FIG. 12, a light source mounting component 6 is provided in the embodiment 5, the light source mounting component 6 is fixedly connected to the support frame 7 or is not fixedly connected to the support frame 7, the light source mounting component 6 is provided with a light source placing position, and the light source placing position is disposed on a periphery of the large dial 1.

In an illustrated embodiment, when the large dial 1 is fixedly connected to the support frame 7, the light source mounting component 6 can be directly fixed to the large dial 1. When the vernier disc 3 is fixedly connected to the support frame 7, the light source mounting component 6 may be directly fixedly connected to the vernier disc 3.

Embodiment 6

Figure 13:
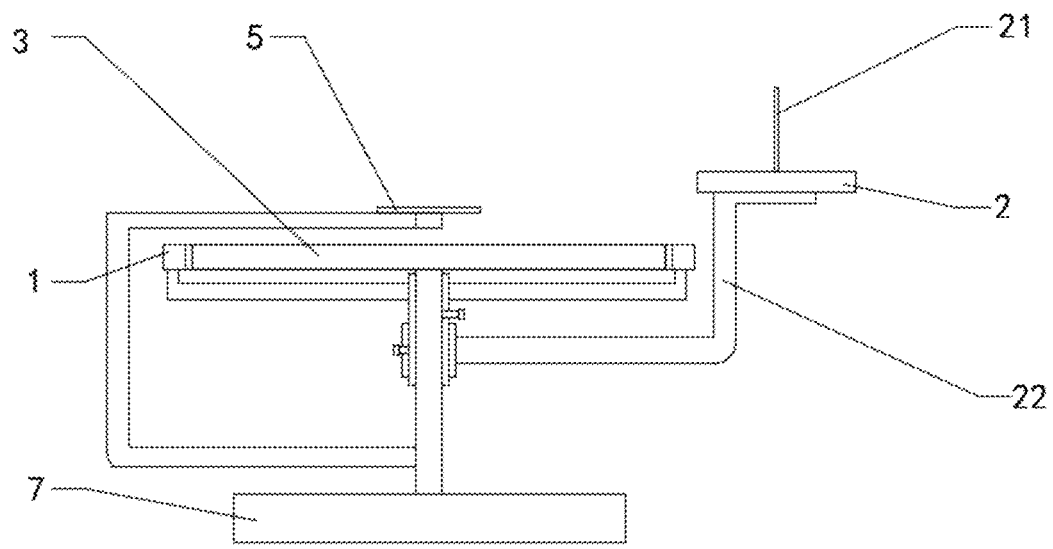
FIG. 13 illustrates a schematic structural diagram of a dual-dial measurement device for viewing angle measurement of an optical component according to an embodiment 6 of the disclosure.

As shown in FIG. 13, in the embodiment 6, the objective table 5 is connected to the support frame 7 through a side connecting structure.

Embodiment 7

During measurement, a top surface of the small dial 2 and a geometric center of the optical component to be tested 8 are preferably on the same horizontal plane, and therefore, in order to adapt to different sizes of optical components to be tested 8, the height of the small dial 2 in the embodiment 7 can be adjusted, or the height of the objective table 5 can be adjusted.

There are many ways for height adjustment, for example, the objective table 5 is mounted on a telescopic rod; or the small dial 2 is mounted on the telescopic rod, and then the telescopic rod is connected to other components of the disclosure.

Figure 14:
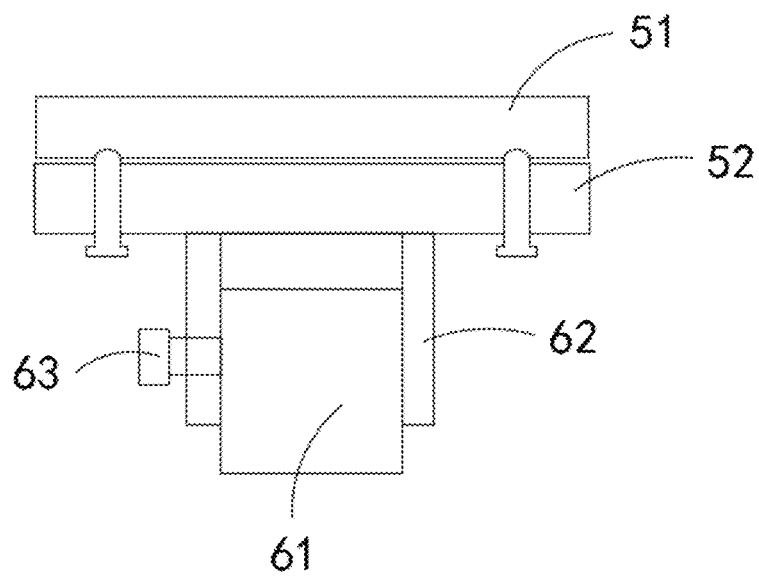
FIG. 14 illustrates a schematic structural diagram of an objective table with adjustable height according to an embodiment 7 of the disclosure.

In an illustrated embodiment, as shown in FIG. 14, the telescopic rod includes a first-degree rod 61, a second-degree cylinder 62 sleeved outside the first-degree rod 61, and a locking rotary knob 63, and the locking rotary knob 63 is used for locking the second-degree cylinder 62 disposed outside the first-degree rod 61.

When the objective table 5 is mounted on the telescopic rod, one of the first-degree rod 61 and the second-degree cylinder 62 is connected to the support frame 7, and the other one is connected to the objective table 5.

Similarly, when the small dial 2 is mounted on the telescopic rod, one of the first-degree rod 61 and the second-degree cylinder 62 is connected to the supporting frame 7, and the other one is connected to the small dial 2.

Embodiment 8

Figure 15:
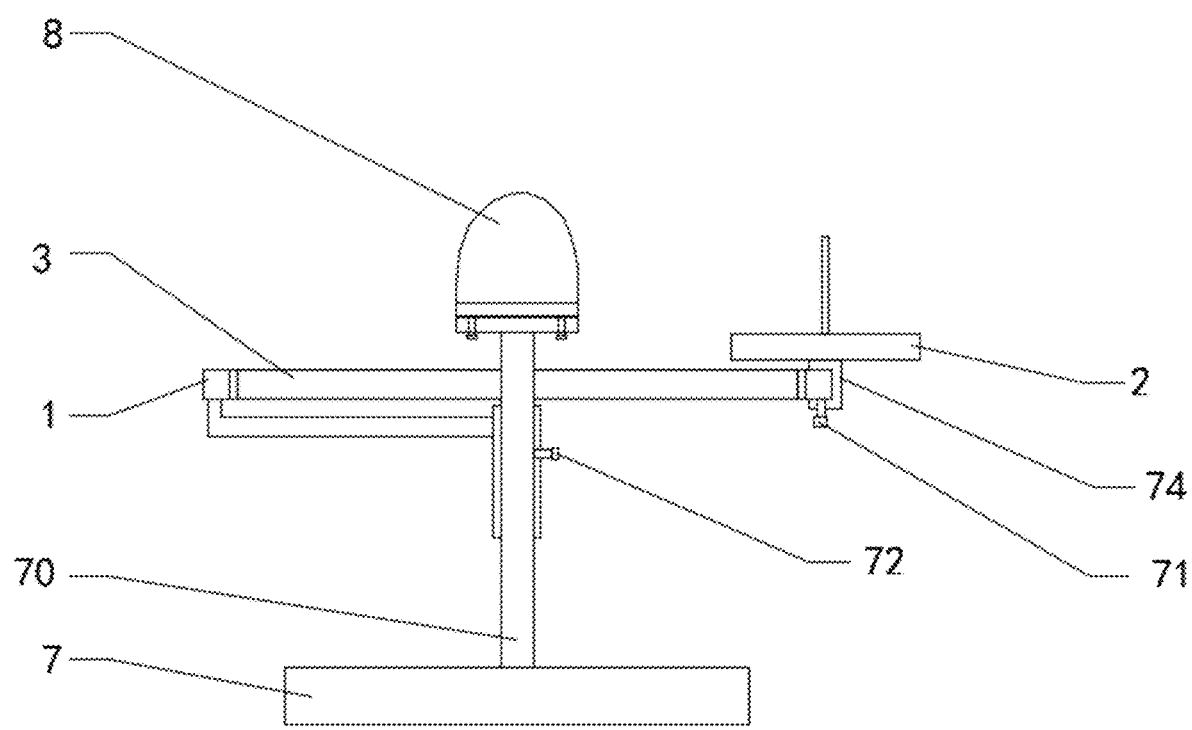
FIG. 15 illustrates a schematic structural diagram of a dual-dial measurement device for viewing angle measurement of an optical component according to an embodiment 8 of the disclosure.

As shown in FIG. 15, in the embodiment 8, the large dial 1 can rotate relative to the support frame 7, the large dial 1 is provided with a sliding block 74, the sliding block 74 can slide on the large dial 1, the small dial 2 is fixedly connected to the sliding block 74, and a first locking knot 71 is disposed between the sliding block 74 and the large dial 1. Therefore, when the first locking knot 71 is fastened, the sliding block 74 and the large dial 1 are fastened together; and vice versa.

Similarly, in an embodiment, the vernier disc 3 can rotate relative to the support frame 7, and therefore, the sliding block 74 is mounted on the vernier disc 3.

The disclosure is mainly used for measuring the exit angle of the exit lights of the optical component when the symmetrical light source is incident, and then calculating the size of the viewing angle of the optical component. The disclosure can measure a viewing angle of a single lens, i.e., a convex lens and a ball, and can also measure a viewing angle of an optical component set, for example, an optical system, i.e., a telescope.

The objectives, technical solutions, and beneficial effects of the disclosure are further described in detail above. However, the above are merely the illustrated embodiments of the disclosure and are not intended to limit the scope of the protection of the disclosure. Furthermore, any modification, equivalent replacement, improvement, etc. made within the spirit and principle of the disclosure fall within the scope of the protection of the disclosure.

What is claimed is:

1. A double-dial measurement device for viewing angle measurement of an optical component, comprising:
   a support frame;
   a large dial, connected to the support frame;
   a small dial, connected to the support frame and capable of rotating relative to the support frame, wherein the small dial is eccentric with the large dial and an axis of the small dial is parallel to an axis of the large dial;
   a vernier disc, connected to the support frame, wherein the vernier disc is coaxial with the large dial;
   at least one vernier, disposed on the vernier disc and attached to the large dial;
   an objective table, connected to the support frame and disposed directly above a center of the vernier disc;
   wherein the large dial and the vernier disc are capable of rotating relative to each other; a first locking knob is disposed between the small dial and one of the large dial and the vernier disc, and when the first locking knob is fastened and the small dial rotates, the one of the large dial and the vernier disc is configured to rotate synchronously;
   wherein a levelness of the objective table is configured to be adjusted and not to be adjusted, a height of the objective table is configured to be adjusted and not to be adjusted, the objective table is configured to be rotated and not rotated relative to the support frame, and a height of the small dial is configured to be adjusted and not to be adjusted; and
   wherein the rotating is a rotation motion centered on the axis of the large dial under an external force.

2. The double-dial measurement device for viewing angle measurement of an optical component according to claim 1, wherein a number of the at least one vernier is two, and the two verniers are spaced 180° apart in a circumference.

3. The double-dial measurement device for viewing angle measurement of an optical component according to claim 1, wherein a top portion of the small dial is provided with a positioning straight rod and the positioning straight rod is coaxial to the axis of the small dial.

4. The double-dial measurement device for viewing angle measurement of an optical component according to claim 1, wherein a manner that the large dial and the vernier disc are capable of rotating relative to each other is realized by one of the following three modes:
   mode 1, the large dial is capable of rotating relative to the support frame, the vernier disc is not capable of rotating relative to the support frame, and a second locking knot is provided between the large dial and the support frame;
   mode 2, the large dial is capable of rotating relative to the support frame, the vernier disc is capable of rotating relative to the support frame, a second locking knot is provided between the large dial and the support frame, and a third locking knot is provided between the vernier disc and the support frame; and
   mode 3, the large dial is not capable of rotating relative to the support frame, the vernier disc is capable of rotating relative to the support frame and a third locking knot is provided between the vernier disc and the support frame.

5. The double-dial measurement device for viewing angle measurement of an optical component according to claim 1, wherein a shape of the large dial is a ring, a shape of the vernier disc is a disc, the vernier disc is disposed in an inner circumference of the large dial, the at least one vernier is fixedly disposed on an edge of the vernier disc, and a top surface of the vernier disc is black or not black; or
   a shape of the vernier disc is a ring, a shape of the large dial is a disc, the large dial is disposed in an inner circumference of the vernier disc, and a top surface of the large dial is black or not black.

6. The double-dial measurement device for viewing angle measurement of an optical component according to claim 5, wherein the support frame comprises a base and a shaft, and the large dial is coaxial with the shaft;
   wherein the shaft is rotatably provided with a first shaft sleeve, the large dial is fixedly connected to the first shaft sleeve, and a second locking knot is disposed between the first shaft sleeve and the shaft; the first shaft sleeve is rotatably provided with a second shaft sleeve, the small dial is fixedly connected to the second shaft sleeve through a connection rod, and the first locking knot is disposed between the second shaft sleeve and the first shaft sleeve; or
   wherein the shaft is rotatably provided with a first shaft sleeve, the vernier disc is fixedly connected to the first shaft sleeve, and a third locking knot is disposed between the first shaft sleeve and the shaft; the first shaft sleeve is rotatably provided with a second shaft sleeve, the small dial is fixedly connected to the second shaft sleeve through a connection rod, and the first locking knot is disposed between the second shaft sleeve and the first shaft sleeve; or wherein the shaft is rotatably provided with a first shaft sleeve and a third shaft sleeve, the large dial is fixedly connected to the first shaft sleeve, and a second locking knot is disposed between the first shaft sleeve and the shaft; the vernier disc is fixedly connected to the third shaft sleeve, and a third locking knot is disposed between the third shaft sleeve and the shaft; one of the first shaft sleeve and the third shaft sleeve is rotatably provided with a second shaft sleeve, the small dial is fixedly connected to the second shaft sleeve through a connection rod, and the first locking knot is disposed between the second shaft sleeve and the one of the first shaft sleeve and the third shaft sleeve; or wherein the shaft is rotatably provided with a first shaft sleeve, the large dial is fixedly connected to the first shaft sleeve, the large dial is provided with a sliding block, the sliding block is capable of rotating, the small dial is fixedly connected to the sliding block, and the first locking knot is disposed between the sliding block and the large dial; or wherein the shaft is rotatably provided with a first shaft sleeve, the vernier disc is fixedly connected to the first shaft sleeve, the vernier disc is provided with a sliding block, the sliding block is capable of rotating, the small dial is fixedly connected to the sliding block, and the first locking knot is disposed between the sliding block and the vernier disc.

7. The double-dial measurement device for viewing angle measurement of an optical component according to claim 6, wherein the objective table is disposed on a top portion of the shaft.

8. The double-dial measurement device for viewing angle measurement of an optical component according to claim 1, wherein the objective table comprises: an adjustable table and a fixed table, the fixed table is fixedly connected to the support frame, the adjustable table is disposed on the fixed table, a circumference of the fixed table is provided with at least three vertical screws at intervals, and when the at least three vertical screws are screwed, the at least three vertical screws are configured to be abutted against the adjustable table from bottom to top.

9. The double-dial measurement device for viewing angle measurement of an optical component according to claim 1, further comprising: a light source mounting component, wherein the light source mounting component is fixedly connected to or not fixedly connected to the support frame, the light source mounting component is provided with a light source placing position, and the light source placing position is dispose at a periphery of the large dial.

10. A measurement method for viewing angle measurement of an optical component based on the double-dial measurement device according to claim 1, comprising following steps:

step 1, placing a light source on an outside of the large dial, placing an optical component to be tested directly above the large dial, wherein the light source and the optical component to be tested are disposed on a horizontal line L1;

step 2, moving the small dial along a circumferential direction centered on the axis of the large dial, wherein a vertical connection line L2 between the axis of the small dial and the axis of the large dial is perpendicular to the horizontal line L1;

reading a scale of the large dial at this time through the vernier recorded as $\alpha_1$ when a number of the at least one vernier is one; or respectively reading scales of the large dial at this time through the two verniers recorded as $\alpha_1$ and $\alpha'_1$ when a number of the at least one vernier is two; and recording a scale of the small dial recorded as $\beta_1$ that the vertical connection line L2 rightly directs;

step 3, continuously moving the small dial along the circumferential direction centered on the axis of the large dial, at which the one of the large dial and the vernier disc is simultaneously moving along with the small dial; when a clear light projection occurs on the small dial, continuously moving the small dial to enable the clear light projection to pass through a circle center of the small dial, at which the small dial stops moving; wherein when a top portion of the small dial is provided with a positioning straight rod, and a projection of the positioning straight rod occurs on the small dial, at which the small dial stops moving; and reading a scale of the large dial at this time through the vernier recorded as $\alpha_2$ when the number of the at least one vernier is one; or respectively reading scales of the large dial at this time through the two verniers recorded as $\alpha_2$ and $\alpha'_2$ when the number of the at least one vernier is two; and recording a scale of the small dial recorded as $\beta_2$, where the light projection overlaps with the small dial; and step 4, calculating an viewing angle of the optical component to be tested through the following formula:

$$\theta=90°-\alpha-\beta,$$

wherein when the number of the at least one vernier is one, $\alpha=|\alpha_2-\alpha_1|$ and $\beta=|\beta_1-\beta_2|$; or when the number of the at least one vernier is two, $$\alpha = \frac{1}{2}|(\alpha_1 - \alpha_2) + (\alpha'_1 - \alpha'_2)|$$

and $\beta = |\beta_1 - \beta_2|$.

* * * * *